Nov. 17, 1959    M. L. COVER    2,913,220
VALVE STRUCTURE AND METHOD OF INSTALLATION
Filed June 20, 1955    2 Sheets-Sheet 1
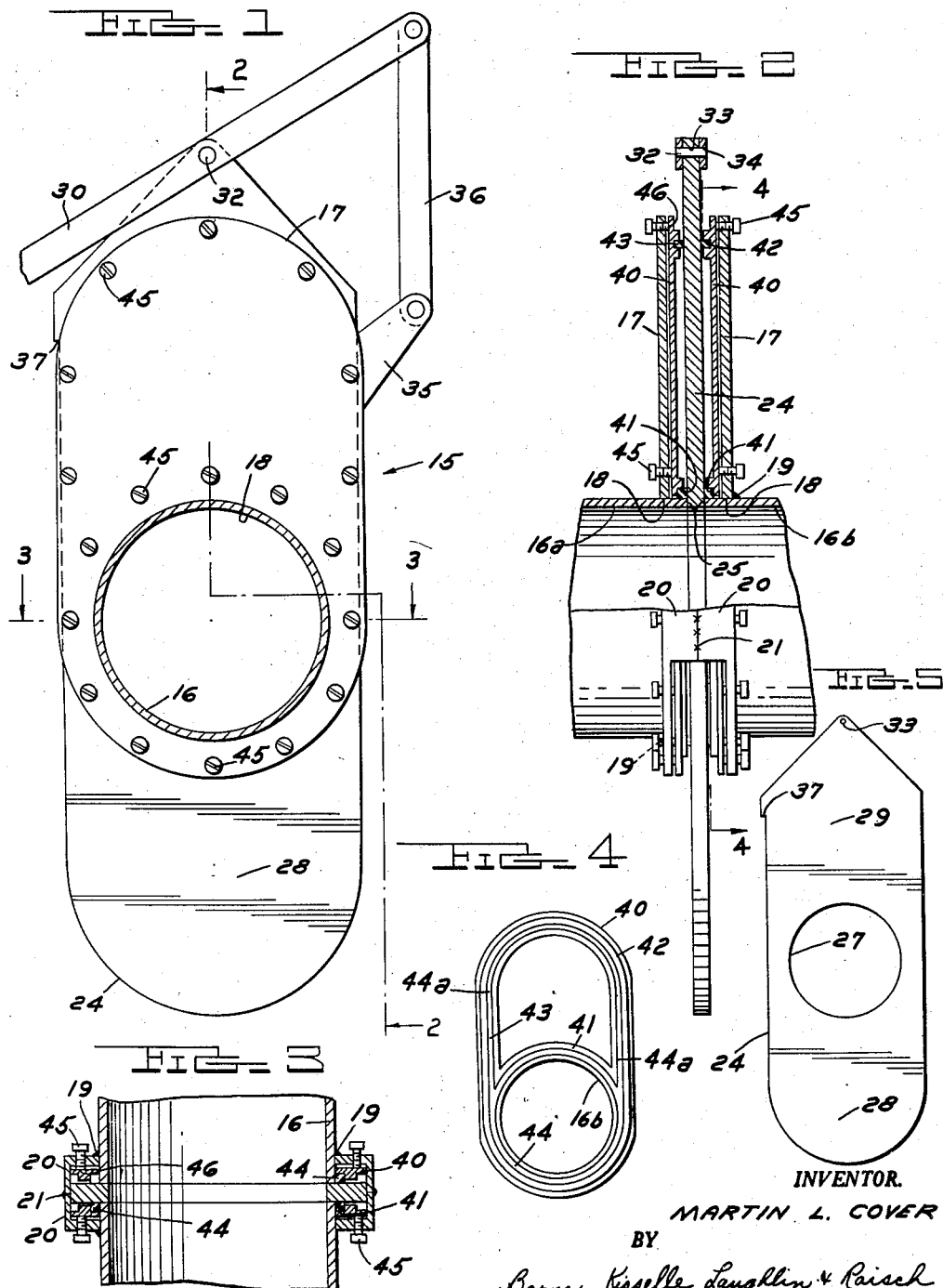
INVENTOR.
MARTIN L. COVER
BY
Barnes, Kisselle, Laughlin & Raisch
ATTORNEYS

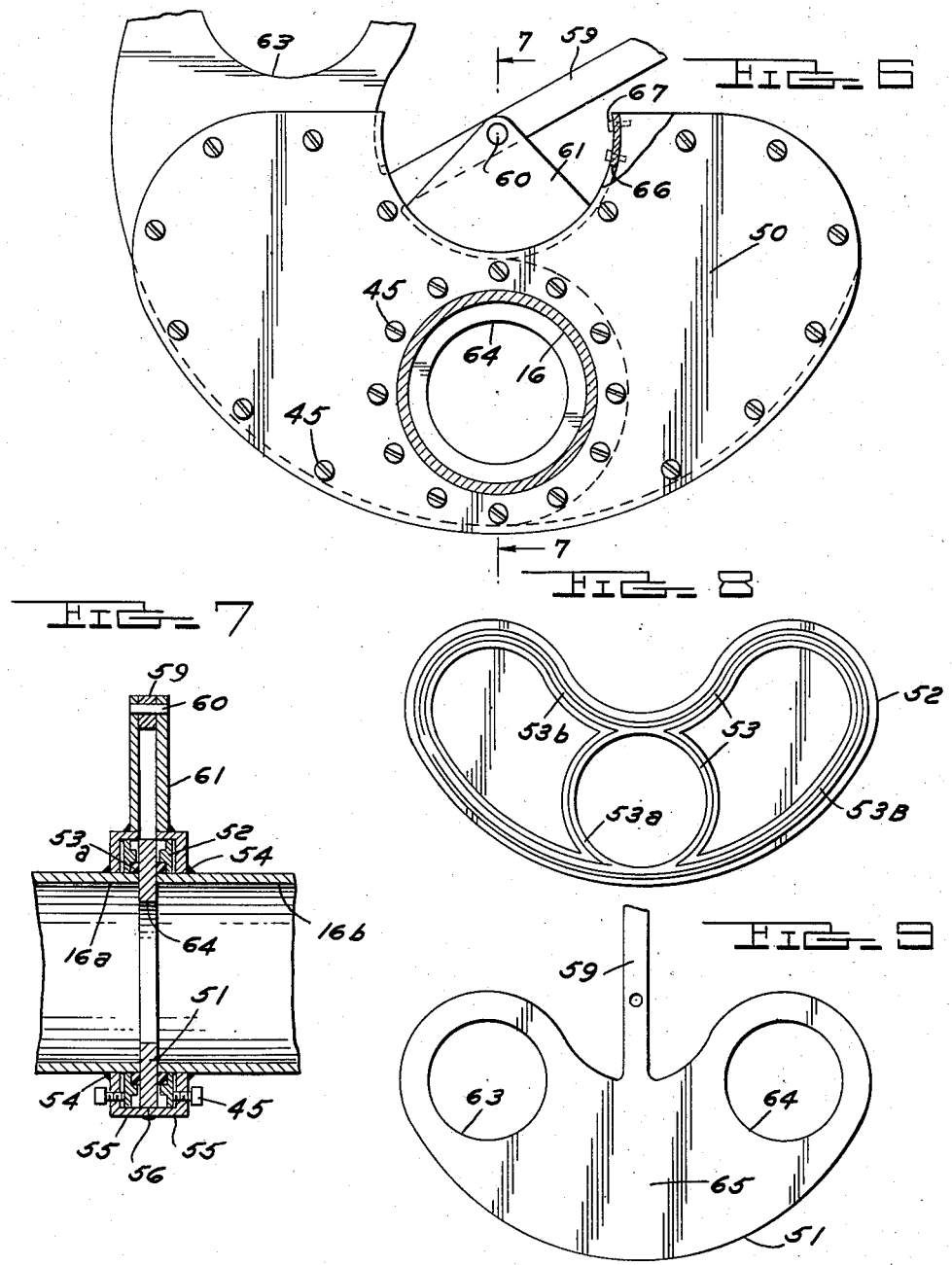

United States Patent Office

2,913,220
Patented Nov. 17, 1959

2,913,220

VALVE STRUCTURE AND METHOD OF INSTALLATION

Martin L. Cover, Churchville, N.Y.

Application June 20, 1955, Serial No. 516,685

17 Claims. (Cl. 251—328)

This invention relates to a valve having general utility in fluid conduit systems and being especially adapted to use in relatively large industrial installations.

Heretofore relatively large industrial valves have been prefabricated and their installation in conduit systems often requires the services and equipment of trained specialists not usually available among plant maintenance personnel. The valves themselves are usually expensive. Installation of large valves is accordingly relatively costly.

An object of this invention is to provide a simple, inexpensive valve structure which can be installed quickly and easily in an industrial conduit system by plant maintenance personnel and the like. Other objects of the invention appear in the detailed description.

The invention generally contemplates the use of two separate body members arranged to be welded at a job site to the end portions of adjacent conduits and arranged to be fastened together with the conduit ends spaced apart to nicely accommodate an apertured valve member. Seal members are interposed between the valve member and body members and are adjustably urged against the valve member by screws on the body members. Two forms of the invention are shown in the accompanying drawings which may be briefly described as follows:

Fig. 1 is a partly diagrammatic elevational view of a valve according to this invention secured to a conduit.

Fig. 2 is a generally sectional view on line 2—2 of Fig. 1.

Fig. 3 is a generally sectional view on line 3—3 of Fig. 1.

Fig. 4 is a generally elevational view on line 4—4 of Fig. 2 showing a gasket plate on a smaller scale.

Fig. 5 is a partly diagrammatic elevational view of the valve member separate from the valve body.

Fig. 6 is a partly diagrammatic elevational view of a modified form of the invention secured to a conduit.

Fig. 7 is a sectional view on line 7—7 of Fig. 6.

Fig. 8 is an elevational view of a gasket plate of the modified form separate from the valve body but on a smaller scale than Fig. 6.

Fig. 9 is an elevational view of the valve member of the modified form separate from the valve body but on a smaller scale than Fig. 6.

Shown in Fig. 1 is a valve 15 according to this invention installed in a pipe or conduit 16. The valve includes a pair of preferably identical body members 17 preferably having generally flat plate form and having openings 18 adapted to be secured around the end portions 16a and 16b of adjacent lengths of conduit by fused metal connections 19 such as by welding. Body members 17 have portions 20 arranged to be fastened together such as by welding 21.

Valve 15 has a valve member 24 formed to fit movably between the adjacent end faces 25 of the lengths of conduit secured to the body members. In the form of the invention shown, end faces 25 extend parallel to each other transversely of the conduit and the valve member has flat plate form with a thickness substantially equal to the distance between the end faces and arranged to slide transversely therebetween.

Valve plate 24 is elongate in its direction of movement and has a central opening 27, one end portion 28 being solid or closed and the other end portion 29 being pivotally connected to an operating lever 30 by a pin 32 extending through openings 33 and 34 in the plate and lever, respectively. Lever 30 is rotatably anchored to a portion 35 of the valve body through a link 36. Valve plate 24 has a projecting shoulder 37 arranged to engage the valve body in an open position of the valve.

A floating plate 40 is provided between each body member 17 and valve plate 24. Each plate 40 has a recessed portion 41 encircling a conduit end, and a recessed portion 42 extending away from the conduit. Recesses 41 and 42 are preferably continuous and carry a gasket 43 which projects into engagement against valve plate 24 and which has a portion 44 supported circumtiguously to a conduit end and a portion 44a extending away from the conduit end in a closed loop as shown. Gaskets 43 are made of a suitable sealing material such as a natural or synthetic rubber or a packing material. Bolts 45 are threaded through body members 17 and their inner ends 46 engage against the outer sides of gasket plates 40.

To install a valve 15, openings 18 in body plates 17 are passed over conduit end portions 16a and 16b. Valve plate 24 is inserted between the conduit ends and end faces 25 thereof are engaged in a snug sliding fit against the valve plate. Openings 18 are welded to the conduit ends and portions 20 of the body members are welded together. The welding may be performed by anyone ordinarily skilled in the art of welding without special training or equipment. Body members 17 hold end faces 25 of the conduit ends apart a distance predetermined by and slightly greater than the thickness of valve plate 24. The conduit ends are secured in axial alignment as shown.

Valve plate 24 is removed from between end faces 25. Plates 40 with gaskets 43 thereon are inserted between end faces 25 and portions 41 thereof are positioned around the conduit ends. Valve plate 24 is slidably inserted between the gasket plates and between end faces 25, and upper end 29 of the valve plate is connected to operating lever 30. Screws 45 are turned to force plates 40 inwardly so that gaskets 43 firmly engage against valve plate 24. A valve may be prefabricated by welding conduit stubs to the body members as described and securing the stubs to conduits as desired.

In use, after the valve has been installed as described, the valve is opened and closed by shifting valve plate 24 rectilinearly upwardly and downwardly as the drawings are viewed. When valve plate 24 is in the downward position of Figs. 1 and 2, opening 27 is in registry with the aligned conduit ends 16a and 16b so that the valve is open. The valve is closed by elevating operating lever 30 and valve plate 24 so that the solid lower end portion 28 of the valve plate closes the conduit. The valve is opened by again lowering the valve member and shoulder 37 thereon engages the valve body to stop its downward movement when opening 27 registers with the conduit ends.

Gaskets 43 are pressed by plates 40 into engagement with the sides of the valve plate and against the exterior of the conduit ends to form a seal at the conduit ends when the valve is fully opened or closed. When the valve plate is in an intermediate position with opening 27 partially registering with the conduit ends, such as when the valve member is being moved between open and closed positions, the space between the upper portions of end faces 25 is open; in such a position closed loop portions 44a of the gaskets form the seals between the conduit ends and valve plate. The upwardly extending portions of the gasket plates and gaskets provide guides for stabilizing the valve plate in its movement transversely of the conduit. Screws 45 may be adjusted inwardly and outwardly to regulate the pressure of the gaskets against the valve plate. Gaskets 43 may be replaced by relieving screws 45 and withdrawing the gasket plates from the valve body; the gasket plates are replaced in the manner described.

Figs. 1–3 illustrate the valve opening 27 as having the same diameter as the interior diameter of conduit 16 so that when the valve is open the interior of conduit ends 16a and 16b and the walls defining opening 27 form a continuous, smooth, unobstructed joint facilitating free passage of fluid through the conduit. This feature of construction is particularly important in a conduit used for conveying granular or particulate matter in a fluid medium, such as compressed air, where any obstruction results in the formation of drifts which tend to clog the conduit. In other applications opening 27 may be made smaller than the diameter of the conduit to provide a metering orifice.

The modification of the invention shown in Figs. 6 through 9 is similar to the principal form except that body plates 50, valve plate 51, gasket plates 52 and gaskets 53 have arcuate form. Gasket 53 has a central conduit encircling portion 53a, which provides a seal in open and closed positions of the valve, and oppositely extending loop portions 53b, which provide seals in partially open position. The body plates 50 are arranged to be welded to conduit ends 16a and 16b as at 54 and have portions 55 arranged to be welded together as at 56. Gasket plates 52 are adjustable relatively to the valve plate by screws 45 on body plates 50.

Valve plate 51 has an operating lever 59 pivotally mounted as at 60 on an element 61 secured to the valve body so that the valve plate moves in a circular path. Valve plate 51 has two openings 63 and 64 at its ends and has a central solid or closed portion 65. Stops 66 are secured on the valve body as by bolts 67. Openings 63 and 64 are smaller than the diameter of conduit 16 to provide metering orifices. Valve member 51 is preferably made of corrosion-resistant material such as a stainless steel, cold rolled steel and the like.

Installation and operation of the modified form of the valve is similar to that of the principal form except that valve member 51 follows a circular path in moving between open and closed positions. To close the valve, operating lever 59 is rotated to bring the solid central portion 65 of the valve member into registry with the conduit ends. To open the valve, the valve member is swung so that either opening 63 or 64 registers with the conduit ends, and in open position, the other opening in the valve plate projects outwardly of the valve body into exposed position. Figs. 6 and 7 illustrate an open position wherein opening 64 provides the orifice and opening 63 is swung outside of the valve body. Operating lever 59 engages a stop 66 to stop opening movement of the valve plate when an opening registers with the conduit ends.

The modified valve structure is especially adapted for metering use in systems where deposits are likely to form on the valve member. Even slight deposits vary the diameter of an orifice to an extent materially affecting the accuracy of a sensitive metering device. This structure facilitates alternative use of orifices 63 and 64 so that one may be cleaned while the other is in use. The valve may thus be used continually without the necessity of a stoppage for cleaning purposes.

The arcuate shape of the valve is particularly adapted to large installations where it is desirable to operate the valve without the necessity of lifting the entire weight of the valve plate. If desired, however, this form of the valve may be modified to provide straight body plates, valve plate, gasket plates and gasket with the valve plate movable rectilinearly to alternatively use orifices at the ends of the valve plate.

I claim:

1. A valve comprising, a pair of body members, each body member being adapted to be secured to a conduit adjacent an end thereof, said body members being constructed and arranged to be fastened together with the ends of the conduits secured thereto spaced apart a predetermined distance and in substantial axial alignment, a valve plate having elongate substantially flat form and having an opening therein, said valve plate having a thickness generally equal to said predetermined distance and being transversely slidable between the conduit ends secured to said body members, means on said body members operable to slide said valve plate for selectively registering said opening with the aligned ends of the conduits, whereby to open and close said valve, a seal plate on each side of said valve plate, said seal plate having an annular portion arranged to encircle the end portion of a conduit, a seal element carried by each seal plate, each seal element having an annular portion supported in engagement around the exteriors of the end portion of such conduit by said annular portion of said seal plate, each seal element projecting into slidable sealing engagement against a side of said valve plate, and threaded means on said body member operable to adjustably urge said seal plates toward said valve plate for regulating the pressure of said seal elements on said valve plate.

2. The valve defined in claim 1 wherein said body members have generally flat plate form, each body member having an opening adapted to be secured around an end portion of a conduit by a fused metal connection.

3. The valve defined in claim 2 wherein said body members are constructed and arranged to be secured to each other by a fused metal connection.

4. The valve defined in claim 1 wherein said seal plates have generally flat form, each seal plate having a recess therein, said seal elements being supported in said recesses against said valve plate and an adjacent conduit end.

5. The valve defined in claim 1 wherein said valve plate is arranged to slide in a rectilinear direction between said body members.

6. The valve defined in claim 1 wherein said valve plate has arcuate form and is arranged to slide in a generally circular path between said body members.

7. The valve defined in claim 1 wherein said valve plate has arcuate form with an opening adjacent each end and an intermediate solid portion, said valve plate being slidable in a circular direction between said body members for selectively registering said openings and said solid portion with the conduit ends, each of said openings being in exposed position relatively to said body members when the other opening is in registry with the conduit ends.

8. A valve comprising, a body adapted to be secured fixedly to the ends of adjacent conduits, said body being arranged to space the conduit ends apart a predetermined fixed distance in substantial axial alignment, a valve plate having an opening therein, said valve plate having a thickness generally equal to said predetermined distance and being arranged to slide transversely between the adjacent conduit ends, a guide plate on each side of said valve plate, said body, valve plates and guide plates being elongate in the direction of movement of said valve plate, means selectively operable to slide said valve member for registering said opening with the conduit ends, a gasket carried by each guide plate and projecting toward said valve plate, means on said valve body and guide plates urging said gaskets into slidable sealing engagement against said valve plate, whereby to guide and support said valve plate, said gaskets being supported by said guide plates so that they encircle and engage the exterior surfaces of the conduit ends, whereby to form a seal between the conduit ends and said valve plate, the latter mentioned means being selectively operable to regulate the pressure of said gaskets against said valve plate, whereby to adjust the sealing effect of said gaskets.

9. A valve comprising, a body adapted to be secured to the ends of adjacent conduits, said body being arranged to space the conduit ends apart a predetermined distance in substantial axial alignment, a valve plate having an opening adjacent each end and having an intermediate solid portion, said valve plate having a thickness generally equal to said predetermined distance, said valve plate being arranged to slide transversely between the adjacent conduit ends, means selectively operable to slide said valve plate for registering said openings and said solid portion with the conduit ends, each of said openings being in exposed position relatively to said body when the other of said openings is in registry with the conduit ends, so that said openings may be cleaned alternatively, and seal means arranged to engage around the end portions of the conduits, said seal means slidably engaging against said valve member.

10. A valve comprising, a body adapted to be secured to the ends of adjacent lengths of conduit, said body being arranged to space the conduit ends apart a predetermined axial distance, means forming a valve member having an opening therein, said valve member being slidable transversely between the conduit ends and being disposed immediately adjacent thereto, means selectively operable to slide said valve member for registering said opening with the conduit ends, and seal means between said valve member and the conduit ends, said seal means having first portions arranged to engage around the end portions of the conduit, said first portions slidably engaging against said valve member and forming a seal when said valve is in open and closed positions, said seal means having other portions extending away from said first portions in the direction of movement of said valve member, said second portions forming a seal when said valve member is in partially open position.

11. A valve comprising, a body adapted to be secured around the ends of adjacent lengths of conduit, said body being arranged to space the conduit ends apart a predetermined distance and in substantial axial alignment, a valve plate having substantially flat form and having an opening therein, said valve plate having a thickness generally equal to said predetermined distance and being transversely slidable between the adjacent conduit, means selectively operable to slide said valve member to open position with said opening in registry with the conduit ends and to closed position with said opening out of registry therewith, seal means, support means supporting said seal means in slidable engagement with said valve member, said seal means having annular portions, said support means supporting said annular portions in engagement around the exteriors of the conduit ends so that said annular portions form a seal when said valve member is in said closed and open positions, said seal means having other portions extending away from said annular portions in the direction of movement of said valve member, said other portions having closed loop form so that said other portions form a seal when said valve member is in partially open position.

12. A valve comprising, a body adapted to be secured to the ends of adjacent conduits, said body being arranged to space the conduit ends apart a predetermined distance in substantial axial alignment, a valve plate having an opening therein, said valve plate having a thickness generally equal to said predetermined distance and being arranged to slide transversely between the adjacent conduit ends, a guide plate on each side of said valve plate, said body, valve plate and guide plates being elongate in the direction of movement of said valve plate, means selectively operable to slide said valve plate to open position with said opening in registry with the conduit ends and to closed position with said opening out of registry therewith, a gasket carried by each guide plate and projecting toward said valve plate, means on said valve body and guide plates urging said gaskets against said valve plate, whereby to guide and support said valve plate in its opening and closing movement, each gasket having an annular portion supported in engagement around the exterior of a conduit end by said guide plate, so that said annular portion forms a seal when said valve member is in said open and closed positions, each of said gaskets having another portion extending away from said annular portion in the direction of movement of said valve member, said annular portion and other portion of each gasket being continuous, said other portion having the form of a closed loop so that when said valve member is in partially open position said other portions of said gaskets form a seal between said valve plate and the conduit ends.

13. A valve comprising, two body members, each body member being adapted to be secured to a conduit adjacent an end thereof, said body members being constructed and arranged to be fastened together with the ends of the conduits secured thereto spaced apart a predetermined distance and in substantial axial alignment, a valve plate having elongate substantially flat form with an opening therein, said valve plate having a thickness generally equal to said predetermined distance and being transversely slidable between the conduit ends secured to said body members for selectively registering said opening with the aligned ends of the conduits, whereby to open and close said valve, a seal support on each side of said valve plate, a seal element carried by each seal support, each seal element having an annular portion supported in engagement around the exterior of the end portion of the conduit by said seal support, each seal element projecting into slidable sealing engagement against a side of said valve plate, and means on each body member operable to adjustably urge said seal supports toward said valve plate for regulating the pressure of said seal elements on said valve plate.

14. The valve defined in claim 13 wherein said body members have generally flat plate form, each body member having an opening adapted to be secured around an end portion of a conduit by a fused metal connection.

15. The valve defined in claim 13 wherein said valve plate is arranged to slide in a rectilinear direction between said body members.

16. The valve defined in claim 13 wherein said valve plate has arcuate form and is arranged to slide in a generally circular path between said body members.

17. A valve comprising two body members, each body member having an opening adapted to receive and to be secured around the exterior of an end portion of a length of conduit, said body members having portions which are adapted to be fastened together, said portions when fastened together forming a spacer extending axially of said body member openings so that the ends of the conduits secured in said openings are spaced apart a predetermined distance, a valve element having a thickness generally equal to said predetermined distance and having an opening therein, said valve element movably fitting between the end faces of the spaced apart conduits and slidably engaging said end faces, means selectively operable to shift said valve member for registering said opening with the conduit ends, means forming a seal element on each side of said valve element, each seal element being arranged to encircle and engage the exterior surface of the end portion of a conduit secured to a body member, and means operative to press said seal elements into slidable but sealing engagement against the sides of said valve element whereby to form a seal between said valve element and the adjacent conduit ends.

References Cited in the file of this patent

UNITED STATES PATENTS

| | | |
|---|---|---|
| 1,010,927 | Letcher | Dec. 5, 1911 |
| 1,384,204 | McMurdie | July 12, 1921 |
| 1,575,259 | Fisher | Mar. 2, 1926 |
| 1,613,138 | Seymour et al. | Jan. 4, 1927 |
| 1,617,503 | Seymour et al. | Feb. 15, 1927 |
| 1,874,627 | Riley | Aug. 30, 1932 |
| 1,933,182 | Pagon | Oct. 31, 1933 |
| 1,958,854 | Kellett | May 15, 1934 |
| 2,271,282 | Young | Jan. 27, 1942 |
| 2,449,145 | Rosmait | Sept. 14, 1948 |
| 2,664,267 | Ray | Dec. 29, 1953 |
| 2,688,987 | Whalen | Sept. 14, 1954 |
| 2,726,683 | Steinbach | Dec. 13, 1955 |
| 2,741,264 | Leonard | Apr. 10, 1956 |
| 2,774,371 | Grannenfelt | Dec. 18, 1956 |
| 2,780,232 | Ney | Feb. 5, 1957 |

FOREIGN PATENTS

| | | |
|---|---|---|
| 23,779 | Great Britain | Nov. 3, 1903 |
| 63,446 | Denmark | Apr. 16, 1945 |
| 1,063,810 | France | May 7, 1954 |